Sept. 18, 1956 J. R. STARBUCK, SR 2,763,068
THREAD GAUGE
Filed June 21, 1952
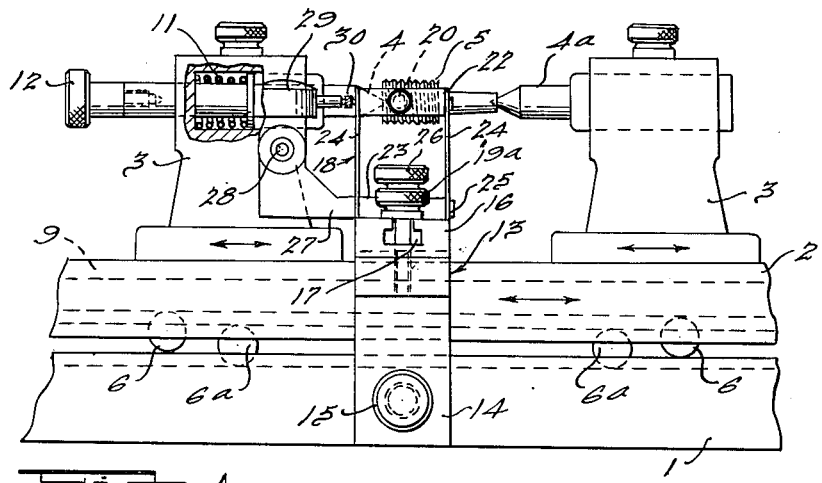
FIG. 1.
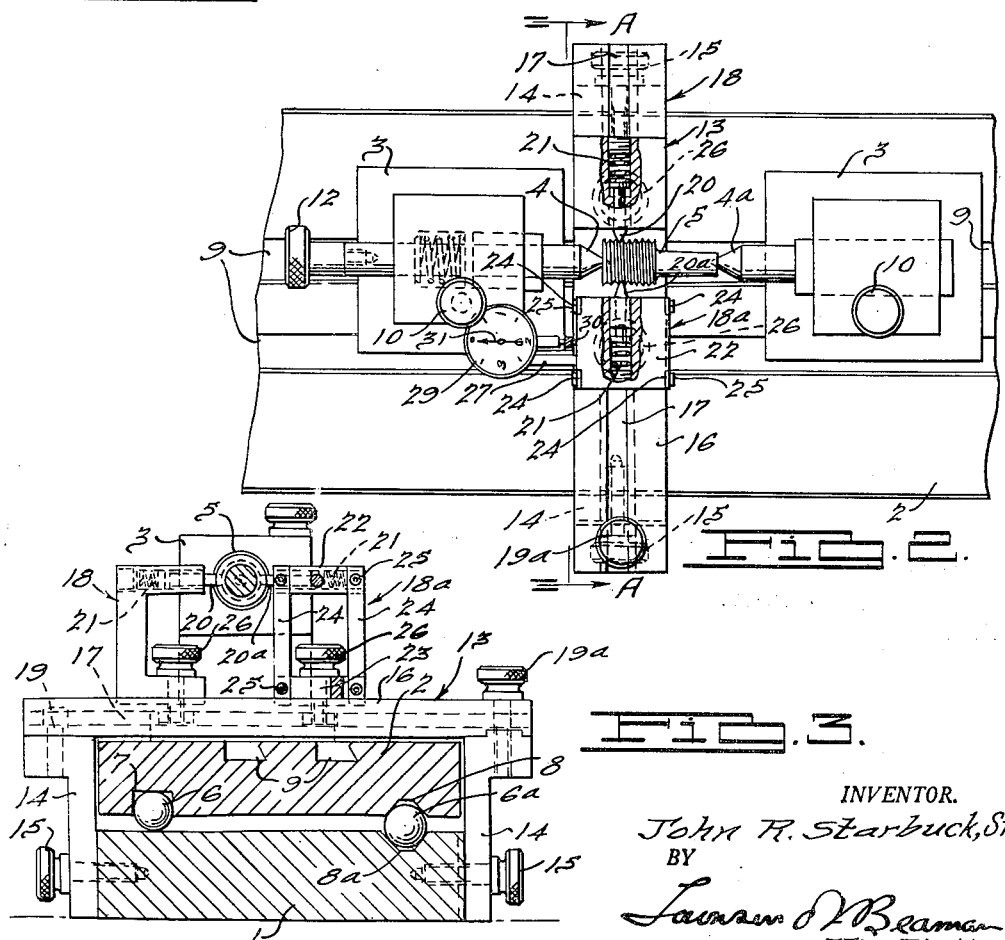
FIG. 2.
FIG. 3.
INVENTOR.
John R. Starbuck, Sr.
BY
Lauren O. Beaman
ATTORNEY.

2,763,068

THREAD GAUGE

John R. Starbuck, Sr., Jackson, Mich., assignor to Aeroquip Corporation, Jackson, Mich., a corporation of Michigan Application June 21, 1952, Serial No. 294,834

1 Claim. (Cl. 33—199)

This invention relates to apparatus for use to detect irregularities in the true helix angle of screw threads, referred to in the trade as "screw thread drunkenness." While the invention is applicable to the testing of screw threaded parts generally it finds especial use for testing screw thread gages.

Screw thread drunkenness may occur anywhere along the length of a screw thread helix and does not necessarily involve a variation in pitch (the distance between the centers of the threads measured parallel to the axis of the screw thread) but involves a deviation of the helix angle of the thread from its true helical path whether the pitch remains constant or varies. The invention, therefore, is not to be confused with the testing of screw threads for lead and pitch errors.

It is the object of the present invention, therefore, to provide means whereby screw threaded parts can be readily tested for the presence of screw thread drunkenness. This, and other objects and advantages of the invention, residing in the construction, arrangement and combination of parts will appear clear from a consideration of the following detailed description of one practical form of the invention, by way of example, with reference to the accompanying drawings, in which:

Fig. 1 is a side elevational view of one form of apparatus in accordance with the invention, showing a screw-threaded gage centered for rotation to detect any deviation in the helix angle and hence the existence of any screw thread drunkenness, Fig. 2 is a plan view of Fig. 1, and Fig. 3 is a transverse section on the line A—A of Fig. 2.

Referring to the drawings, 1 indicates a fixed bed plate on which there is mounted a table 2 carrying a pair of center posts 3 having center pins 4, 4a for engaging in the opposite ends of the part to be tested and for holding the part correctly centered, the part being indicated at 5 and being, in this instance, an externally threaded plug gage.

The table 2 is mounted for longitudinal sliding motion upon the bed plate 1 through the medium of laterally displaced balls 6, 6a. The balls 6 are located in a channel 7 in the underneath surface of the table 2 whereas the balls 6a are located in a composite channel composed of a channel portion 8 in the underneath surface of the table and an opposed companion channel 8a in the top surface of the bed plate 1. This ball and channel guide assembly provides for smooth and easy sliding movement of the table in the longitudinal direction, with the composite channel 8, 8a constraining such motion to take place strictly in the longitudinal direction and eliminating any sideway deviation therefrom.

The center heads 3 are slidably mounted in a common longitudinal channel 9 in the top surface of the table 2 and are capable of being fixed in adjusted positions along said channel by manipulation of the lock screws 10 according to conventional practice. Two channels 9 are shown provided for optional fitting of the center heads therein.

Whereas the center pin 4a may be fixed in its head 3, the other center pin 4 is slidably mounted in its head and has an associated coil spring 11 for resiliently loading this pin to its projected position. The center pin 4 has a hand knob 12 fixed on its outer end, which knob can be actuated to retract the center pin to facilitate assembly of the part 5 between the center pins 4, 4a.

Mounted upon the bed plate 1 there is a saddle structure, indicated generally at 13, composed of vertical legs 14 secured to opposite sides of the bed plate, as by the screw bolts 15, and a top plate 16 having a channel 17 in which there is slidably mounted a pair of thread follower heads 18, 18a which are adjustable along the channel 17 in perpendicular relationship to the adjustment of the center heads 3 along their channel 9.

The top saddle plate 16 is shown secured to the saddle legs 14 by the screw studs 19, 19a.

The thread follower heads 18, 18a carry thread follower pins 20, 20a which are resiliently mounted in their follower heads by the coil springs 21 and have their outer ends tapered, as seen in Fig. 2, to correspond to the thread taper angle, being 60° taper angle for the standard U. S. screw thread.

The thread follower pin 20, while resiliently mounted in its head 18, is only permitted to partake of movement perpendicular to the axis of rotation of the part 5 and, unlike the pin 20a, is restrained in its head 18 against movement in the direction of said axis. This pin 20, therefore, constitutes a driver for producing movement of the table 2 to cause the other pin 20a to move along the screw thread in the part 5 as the latter is rotated in the testing of the part for any helix angle deviation and hence, drunkenness.

The thread follower head 18a is composed of upper and lower vertically spaced horizontal plates 22, 23 united by four vertically extending flat spring strips 24 defining four corners of a rectangle with their edges facing in the direction of the opposite follower head 18 so that the follower head 18a is rigid with respect to movement in such direction but is free to move in a direction perpendicular thereto (i. e. parallel with the axis of the part 5) by flexure of the springs 24, these being shown secured at their ends to the plates 22, 23 by screw studs 25.

The thread follower heads 18, 18a are, individually, adjustable along the guide channel 17 and are capable of being locked in their adjusted positions by manipulation of the lock screws 26.

Extending rigidly from one side of the bottom plate 23 there is an arm 27 on which there is pivotally mounted, about the horizontal axle 28, a dial indicator 29 incorporating a plunger 30, which is sensitively spring loaded and connected to actuate the dial pointer 31. This plunger is adapted to be located against the top plate 22 of the thread follower head 18a, as seen in Figs. 1 and 2. The indicator dial 29 is rotatable about a vertical axis so that it may be hand set to zero position with respect to the dial graduations and the pointer 31.

In operation, to install the part 5 in the apparatus for checking the accuracy of its screw thread and detecting any drunkenness therein, the centering pin 4 is retracted against its spring 11 by actuation of the knob 12 to enable the ends of the part 5 to be located between the pins 4 and 4a, whereupon the knob 12 is released and the part is held firmly centered between the pins 4, 4a. The lock screws 10 permit coarse individual adjustment of the center heads 3 to the approximate spacing required to accommodate the part 5 lengthwise between the centering pins. With the article 5 firmly held between the centering pins and the center heads locked in their adjusted positions upon the table 2, and with the thread follower heads 18, 18a slid outwardly along their guide channel 17, the table 2 is then moved upon its ball bearing supports 6, 6a to position the lead of the screw thread in the part 5 opposite the thread follower pins 20, 20a. The thread follower heads 18, 18a are then moved inwards to engage their thread follower pins in the thread and are locked in this position on their guide slot 17 by actuation of the lock screws 26. The apparatus is then ready for use, it having first been ascertained that the dial plunger 30 is in contact with the top plate 22 of the follower head 18a. Swinging movement of the dial indicator 29 about the axle 28 and manipulation of the locking screw 31 permits this to be done. If the part 5 is now rotated slowly by hand the table 2 will move upon its ball bearing supports 6, 6a, due to the reaction at fixed pin 20, which acts as a driver to cause the rotary movement of the part 5 to be translated into sliding of the table 2, with the thread follower pin 20a engaged in the screw thread. If the helix angle of the screw thread is accurate there will be no movement of the dial plunger 30 but if any drunkenness is present this will be immediately revealed by observing movement of the dial pointer 31 due to flexing of the springs 24 and movement of the dial plunger 30. Since the thread follower pin 20a is mounted upon the plate 22 to extend in the direction in which this plate is held against movement due to the disposition of the springs 24, which are rigid in this direction, and the springs only permit movement of the plate in a direction perpendicular to said first mentioned direction, which perpendicular direction is parallel with the longitudinal axis of the part 5 being tested, it follows that actual drunkenness will be shown directly by the dial pointer 31 without the need for any computation. In other words, the plate 22, and hence the thread follower 20a can only move in a direction parallel with the axis of the part 5 and since the dial plunger 30 is located against this plate for direct movement corresponding to any movement of the plate in the direction of the longitudinal axis of the part 5 the occurrence and extent of such movement is immediately indicated by movement of the dial pointer.

The ball mounting of the table 2 provide a free smooth movement of the table relatively to the fixed bed plate 1 and thread follower heads 18, 18a as the part 5 is rotated simply by hand actuation while held centered between the centering pins 4, 4a. The arrangement of the springs 24 provides complete rigidity to the thread follower head 18a with respect to movement in a direction perpendicular to the axis of rotation of the part 5, but provides sensitive movement of the top plate 22 parallel with such axis, whereby any deviation of the thread helix angle from its true helical path is immediately detected and revealed by angular movement of the indicator pointer 31.

Having thus described my invention what I claim as novel and wish to secure by Letters Patent is as follows:

A gauge for checking the screw thread drunkenness of a thread gauge or the like comprising in combination a fixed bed, a rigid non-tiltable table mounted on said bed for straight line longitudinal movement relative to said bed, a pair of center posts carried by said table and having axially aligned center pins for rotatably supporting the thread gauge to be checked, a rigid saddle structure attached to said bed and bridging said table between said posts, a driver thread follower engageable with the threads of the thread gauge to move said table relative to said saddle upon rotation of the thread gauge, mounting means for said follower upon said saddle to position said follower to one side of the axis of said pins and rigidly supporting said follower against movement parallel to said axis, a detector thread follower engageable with the threads of the thread gauge, mounting means for said detector follower upon said saddle to locate said detector follower on the opposite side of said axis in substantially opposed relation to said driver thread follower, said followers having tapered end portions for engaging with the threads of the gauge to be checked, said mounting means for said detector thread follower taking the form of a plate, spaced upright supports for said plate in the form of relatively thin flat elongated springs rigidly supported at their lower ends by said saddle, said springs being spaced from each other along the said axis and being disposed in parallel planes normal to said axis whereby said springs give deflectable support to said plate parallel to said axis and relatively rigid support to said plate normal to said axis, an indicator rigidly mounted on said saddle and having a plunger engaging with said plate and actuated thereby to measure and give a direct reading of the amount of relative movement between said table and said detector thread follower to indicate the amount of drunkenness of the thread gauge being checked and resulting from the rotation of the gauge between said pins with said followers engaging the threads of the gauge, the amount of the reading of the indicator being the actual deflection of the detector thread follower along said axis.

References Cited in the file of this patent

UNITED STATES PATENTS

| 1,456,938 | Schoof | May 29, 1923 |
| 1,656,314 | Buckingham | Jan. 17, 1928 |
| 2,388,582 | Sorenson | Nov. 6, 1945 |
| 2,409,924 | Bauer | Oct. 22, 1946 |